(12) United States Patent
Terashi (10) Patent No.: US 6,646,426 B2
(45) Date of Patent: Nov. 11, 2003

(54) CURRENT MODE DC/DC REGULATOR HAVING FUNCTION FOR DETECTING INPUT AND OUTPUT OF CURRENT AND VOLTAGE

(75) Inventor: Hiroto Terashi, Nagaoka (JP)

(73) Assignee: Densei-Lambda Kabushiki Kaisha (JP)

(*) Notice: Subject to any disclaimer, the term of this patent is extended or adjusted under 35 U.S.C. 154(b) by 0 days.

(21) Appl. No.: 10/104,416

(22) Filed: Mar. 22, 2002

(65) Prior Publication Data

US 2002/0135345 A1 Sep. 26, 2002

(30) Foreign Application Priority Data

Mar. 22, 2001 (JP) .......................... 2001-82999

(51) Int. Cl.[7] ................................. G05F 1/40
(52) U.S. Cl. ............................ 323/285; 323/284
(58) Field of Search ............................ 323/282, 284, 323/285, 290, 299

(56) References Cited

U.S. PATENT DOCUMENTS 4,456,872 A * 6/1984 Froeschle .................. 323/286
4,688,162 A * 8/1987 Mutoh et al. .............. 363/80
5,045,771 A * 9/1991 Kislovski ................... 323/282
5,798,635 A * 8/1998 Hwang et al. .............. 323/222

* cited by examiner

Primary Examiner—Shawn Riley
(74) Attorney, Agent, or Firm—Akerman Senterfitt (57) ABSTRACT

A current mode DC/DC converter provided with a current mode control circuit 51, serving as a feedback circuit for stabilizing an output voltage Vo supplied to a load resister RL, which detects a coil current I2 flowing through a choke coil L1 and control switching operation of a switching element Q1 according to a result of comparison between a detection signal of the coil current I2 and an error signal from an error amplifier A1 serving as a reference signal. The current mode control circuit 51 is provided with a feed forward circuit 41 which detects a variation in a load current Io flowing through a load resister RL and adds the variation to the detection signal of a coil current I2. Accordingly, a switching pulse, by which the coil current I2 changes quickly in response to an abrupt change in the load current Io, can be fed to the switching element Q1.

5 Claims, 5 Drawing Sheets

CURRENT MODE DC/DC REGULATOR HAVING FUNCTION FOR DETECTING INPUT AND OUTPUT OF CURRENT AND VOLTAGE

BACKGROUN OF THE INVENTION

1. Field of the Invention

The present invention relates to a current mode DC/DC converter provided with a current mode control circuit, serving as a feedback circuit for stabilizing an output voltage, which detects a current flowing through a choke coil and controls switching operation of a switching element according to a result of comparison between a detection signal due to the current and a reference signal.

2. Description of the Related Art

Generally, a DC/DC converter, specifically a current mode DC/DC converter with a current mode control circuit is one where a current flowing through a choke coil at an output side is detected and a DC output voltage supplied to a load is stabilized by controlling switching operation of a switching element according to a result of comparison between a detection signal due to the current and a reference signal.

Figure 3:
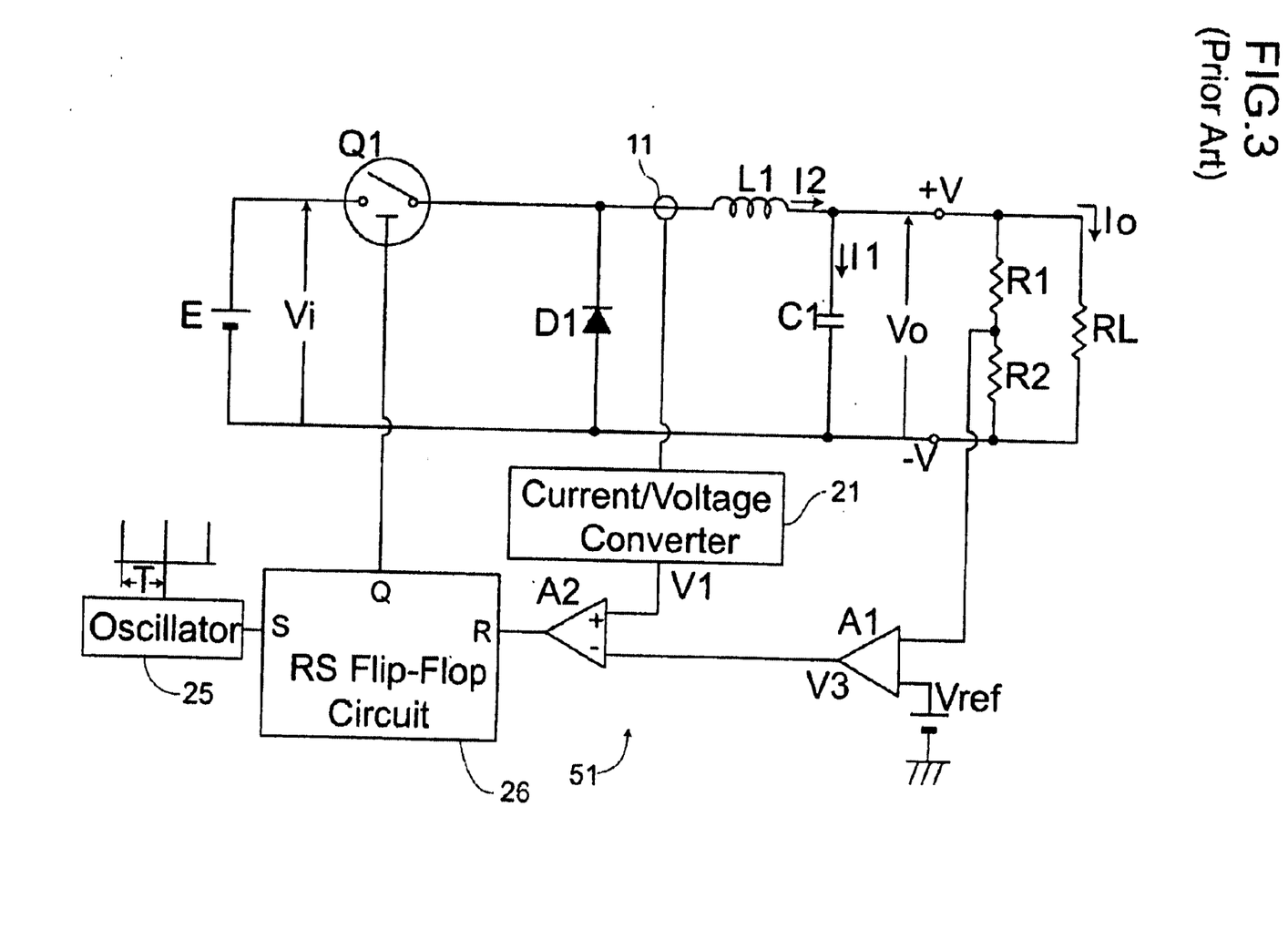
FIG. 3 is a circuit diagram showing a conventional current mode DC/DC converter.

FIG. 3 shows a circuit diagram displaying one example of such a current mode DC/DC converter. In the figure, reference symbol E denotes a DC source supplying an input voltage Vi and a series circuit of a switching element Q1 and a free wheeling diode D1 is coupled across the DC source E, while a series circuit of a choke coil L1 and a smoothing capacitor C1 is coupled across the free wheeling diode D1 and a DC output voltage Vo generated in the smoothing capacitor C1 according to switching operation of the switching element Q1 is supplied to a load resister RL, that is a load, coupled between output terminals +V and −V. A current mode control circuit 51, serving as a feedback circuit for stabilizing an output voltage Vo, is coupled, which is provided with; voltage divider resisters R1, R2, for detecting the output voltage, coupled between the terminals +V and −V, an error amplifier A1 for amplifying an error between an output voltage detection signal output from a junction point of the voltage divider resisters R1, R2 and a reference voltage Vref, a current detector 11 for detecting the current I2 flowing through the choke coil L1, a current/voltage converter 21 for converting a detection current from the current detector 11 to a voltage, a comparator for outputting a reset pulse to turn off said switching element Q1 when a voltage V1 of a coil current detection signal supplied from the current/voltage converter 21 exceeds a voltage V3 of an error signal serving as a reference signal output from an error amplifier A1, and a RS flip-flop circuit 26 for turning on the switching element Q1 by a set pulse with cycle T output from an oscillator 25 and for turning off the switching element Q1 by a reset pulse from the comparator A2.

In the circuit in FIG. 3 abovementioned, when the switching element Q1 turns on by the set pulse from the oscillator 25, the free wheeling diode D1 turns off so that an input voltage Vi is applied to the series circuit of the choke coil L1 and the smoothing capacitor C1 and so a coil current I2 increases linearly with the lapse of time. As a result, when the coil current I2 becomes greater than a current consumed by the load resister RL, that is, a load current Io, the smoothing capacitor C1 is charged so that an output voltage Vo across the smoothing capacitor C1, in turn, across the load resister RL increases. On the other hand, in the current mode control circuit 51, a voltage detection signal yielded by dividing the output voltage Vo with the voltage divider resisters R1, R2 is compared with the reference voltage Vref by the error amplifier A1 so that an error signal obtained by amplifying the magnitude of the error is fed to one side of input terminals of the comparator A2. Apart from this, the coil current I2 flowing through the choke coil L1 is detected by the current detector 11 so that the coil current detection signal corresponding to the coil current I2 is fed from the current/voltage converter 21 to the other input terminal of the comparator A2. Then, the comparator A2 compares the voltage V1 of the coil current detection signal with the voltage V3 of the error signal and when the voltage V1 of the coil current detection signal exceeds the voltage V3 of the error signal, a reset pulse is output from the comparator A2 so that a voltage level of the output terminal is changed from a H (High) level to a L (Low) level to turn off the switching element Q1.

When the switching element Q1 turns off, the free wheeling diode D1 turns on so that energy already stored in the choke coil L1 is discharged. As a result, the coil current I2 of the choke coil L1 decreases linearly with the lapse of time and when the coil current I2 becomes less than the load current Io, electric charges are supplied from the capacitor C1 to the load resister RL so that the output voltage Vo decreases. After the lapse of one cycle, the set pulse is generated from the oscillator 25 so that the switching element Q1 turns on again and the coil current I2 and the output voltage Vo begin to increase also again.

Thus, the output voltage Vo changes with ripples by switching the switching element Q1. However, an amplitude of the variation is almost negligible in comparison with the magnitude of the output voltage Vo and therefore the output voltage Vo can be regarded as substantially stable at a certain value. Further, at the time of ON state of the switching element Q1, when the coil current I2 of the choke coil L1 increases, one fourth of a cycle later, the output voltage Vo also begins to increase and at the time of OFF state of the switching element Q1, when the coil current I2 of the choke coil L1 decreases, one fourth of a cycle later, the output voltage Vo also begins to decrease. In other word, the coil current I2 and the error signal from the output terminal of the error amplifier A1 are mutually in proportional relationship.

Figure 4:
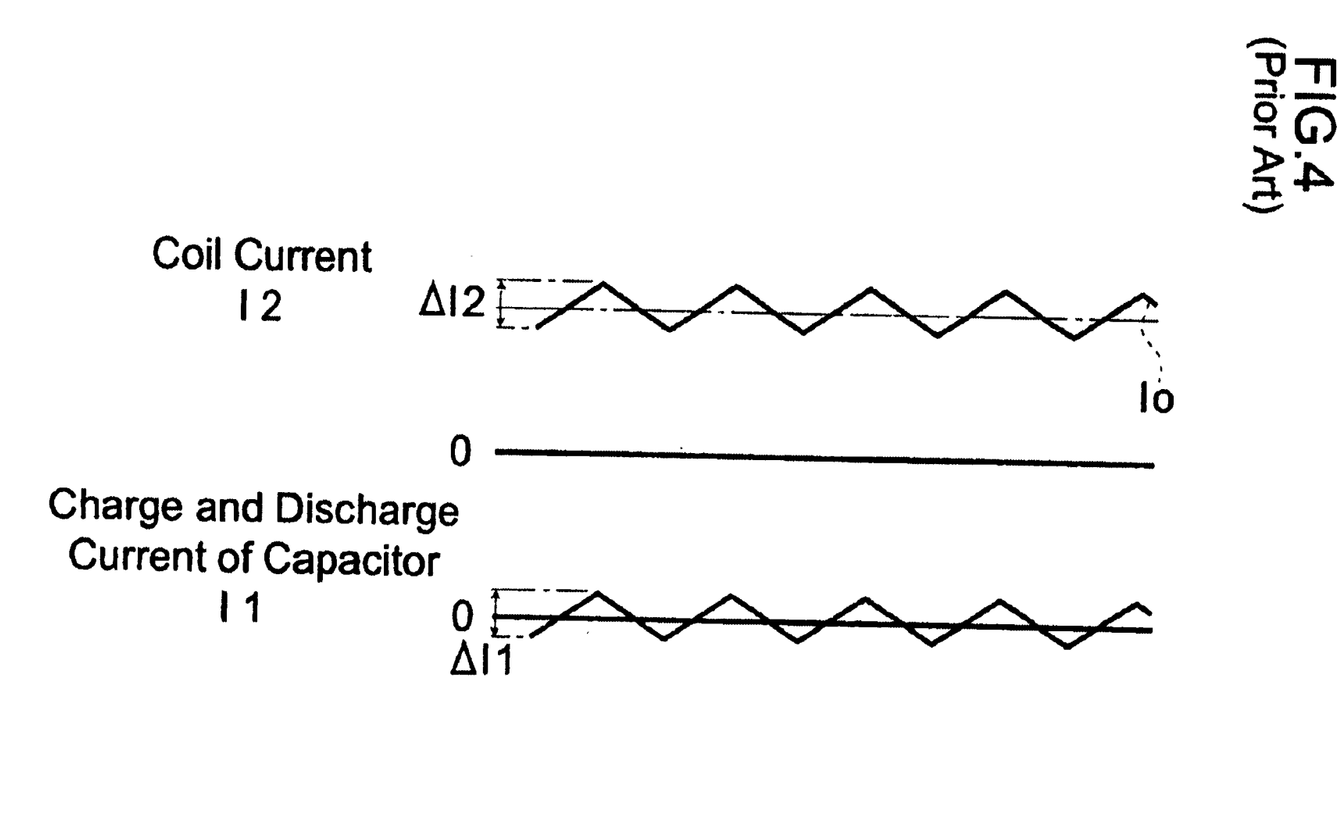
FIG. 4 is a waveform diagram of each section at steady state in a conventional current mode DC/DC converter.

FIG. 4 shows each of waveforms of, the load current Io at the time of steady state, the charge and discharge current I1 of the capacitor C1 and the coil current I2, in the circuit of abovementioned FIG. 3. As described above, at the time of ON state of the switching element Q1, the coil current I2 increases linearly and when the coil current I2 becomes greater than the load current Io, a flowing direction of the charge and discharge current I1 of the capacitor 1 is converted from that for discharge to that for charge. On the other hand, when the switching element Q1 turns off, the coil current I2 decreases linearly and when the coil current I2 becomes less than the load current Io, the flowing direction of the charge and discharge current I1 of the capacitor C1 is converted from that for charge to that for discharge. At steady state, according to switching operation of the switching element Q1, the charge and discharge current I1 and the coil current I2 change with ripples. (see ΔI1, ΔI2, in FIG. 4).

Figure 5:
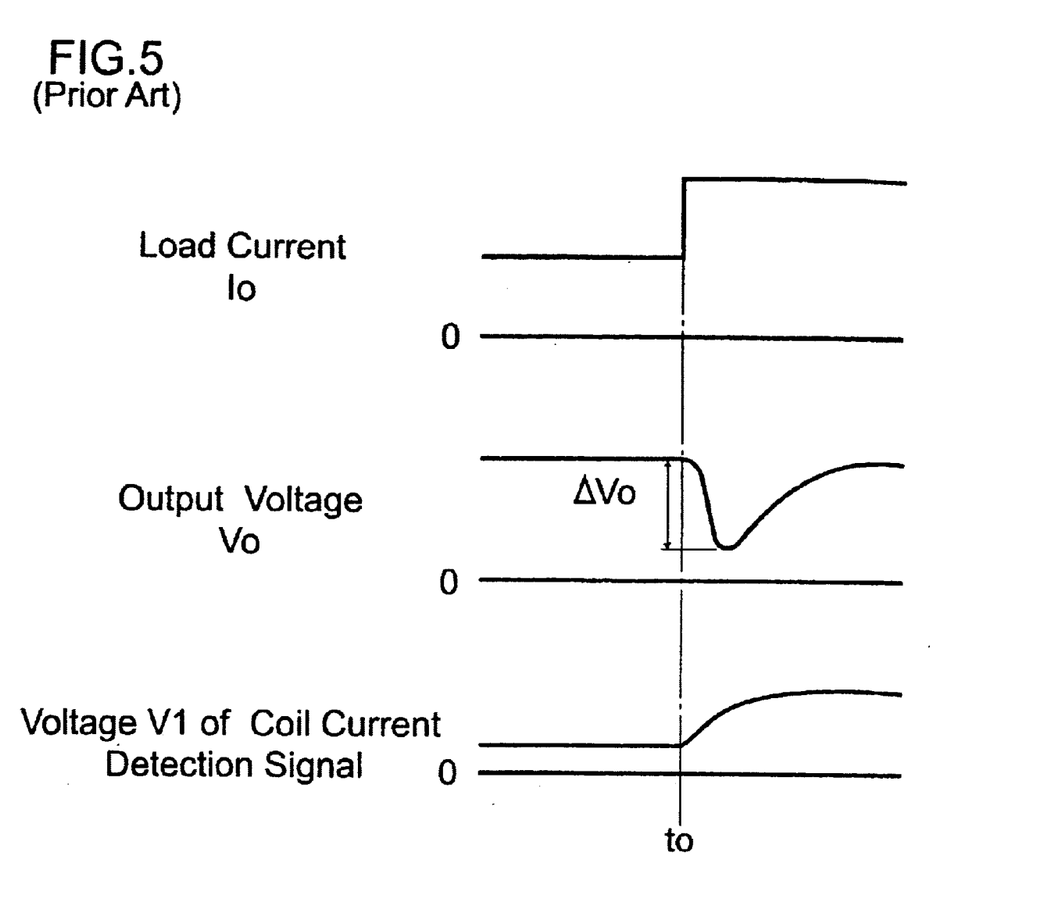
FIG. 5 is a waveform diagram of each section at the time of an abrupt change in load current in a conventional current mode DC/DC converter.

Now, in the DC/DC converter with abovementioned current mode control circuit 51, due to delay of response or the like at the time of an abrupt change of a load current in control systems comprising the error amplifier A1 and the comparator A2, there occurs a problem that stability of the output voltage Vo is lost so that the output voltage Vo changes in a great degree. Specifically, as shown in FIG. 5, if the output current Io increases abruptly, for example, at the time to, in the first place, electric charges corresponding to the abrupt increase are supplied to the load resister RL from the smoothing capacitor C1 and next, the coil current I2, in turn, also the voltage V1 of the coil current detection signal increases gradually. However, the current mode control circuit 51, due to delay of response within the circuit, cannot immediately feeds a pulse drive signal, that is required to keep the output voltage Vo constant, to the switching element Q1 so that the output voltage Vo decreases in a great degree immediately after an abrupt change in the load current Io. (see the variation ΔVo in FIG. 5).

Further, in the aforementioned current mode control circuit 51, a phase compensation circuit (not shown in the figures) for improving a frequency characteristic is provided with the error amplifier A1 and the comparator A2 in order to secure stability at steady state. However, since the current mode control circuit 51 is so composed that a feed back circuit itself detects the coil current I2 and the output voltage Vo, that are output, to compensate those current and voltage, necessarily the output voltage Vo is changeable if there occurs delay of response within the current mode control circuit 51.

SUMMARY OF THE INVETION

The present invention is achieved in view of the above-mentioned problem and it is an object of the present invention to provide a current mode DC/DC converter wherein an output voltage changes in not a great degree even at the time of an abrupt change in a load current.

A current mode DC/DC converter of the present invention provided with a current mode control circuit, serving as a feedback circuit for stabilizing an output voltage supplied to a load, which detects a coil current flowing through a choke coil and controls switching operation of a switching element according to a result of comparison between a detection signal of the coil current and an error signal of the output voltage, serving as a reference signal, wherein a feed forward circuit is provided which detects a variation in the load current flowing through the aforementioned load, adding the variation to the detection signal of the coil current.

In this case, since the load current is almost unchangeable at steady state, no variation in the load current is detected by the feed forward circuit so that the current mode control circuit controls, in the same way as does a conventional power converter, switching operation of the switching element according to a result of comparison between a detection signal of the coil current flowing through the choke coil and an error signal of the output voltage serving a reference signal. Accordingly, a characteristic of the current mode control at steady state is the same as that of a conventional power converter.

On the other hand, when the load current changes abruptly on account of some cause or other, the feed forward circuit detects the variation in the load current at the time to add the variation to the detection signal of the coil current. The current mode control circuit compares the signal that is the sum of a signal obtained by adding the variation in the load current to the detection signal of the coil current and the error signal of the output voltage serving as a reference signal to control switching operation of the switching element by the result of the comparison. As a result, a switching pulse by which the coil current can change quickly in response to the abrupt change in the load current can be fed from the current mode control circuit to the switching element so that the variation in the output voltage can be reduced.

BRIEF DESCRIPTION OF THE DRAWINGS

For a more complete understanding of the present invention, reference is now made to the following description taken in conjunction with accompanying drawings, in which.

DESCRIPTION OF THE PREFERRED EMBODIMENT

Hereunder is a detailed description of a current mode DC/DC converter of the present invention with reference to accompanying drawings. Here, the same reference symbols are used for parts the same as in FIG. 3 showing the aforementioned conventional example and a detailed description in common with it is omitted to avoid repetition.

Figure 1:
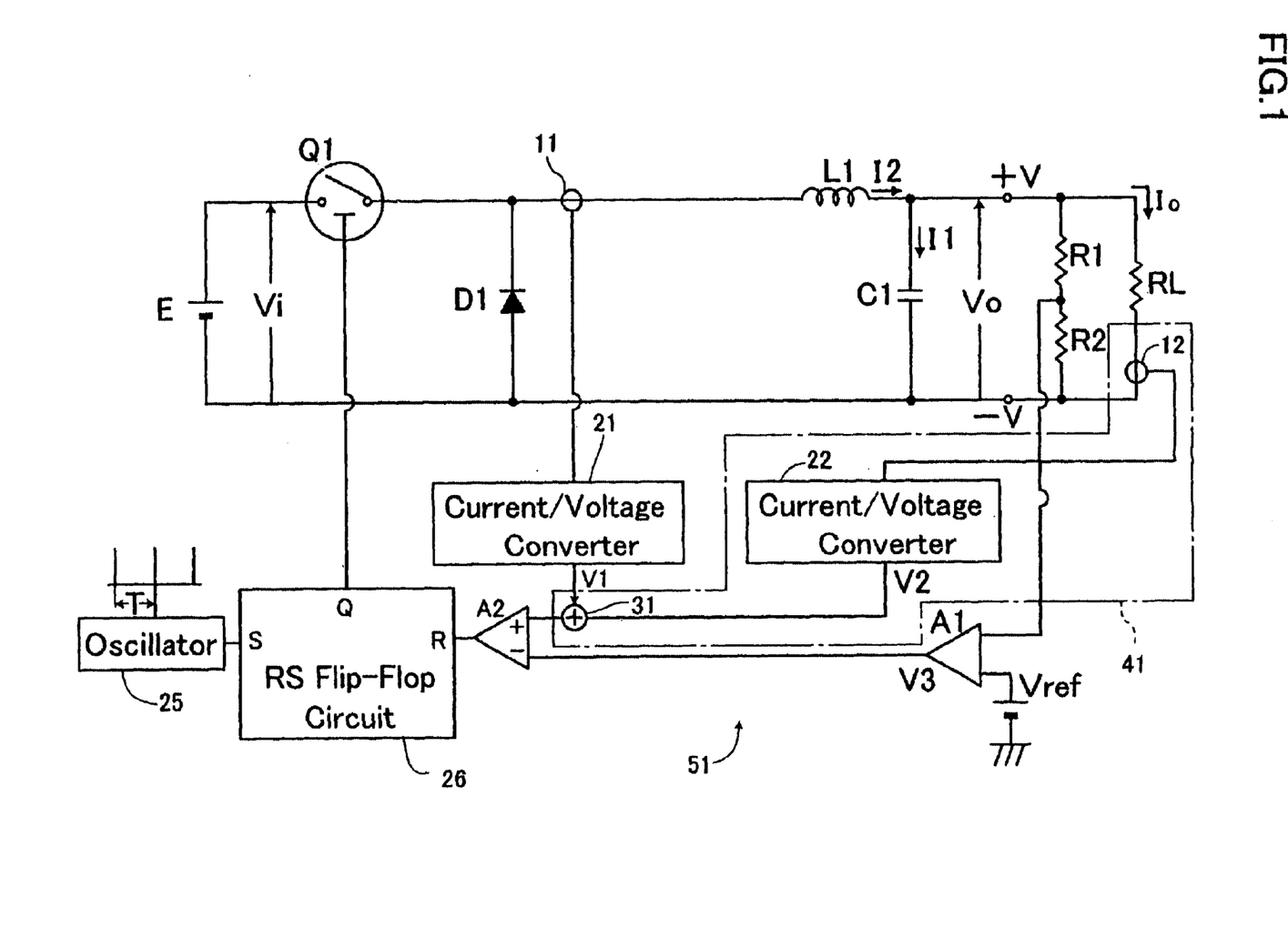
FIG. 1 is a circuit diagram showing a DC/DC converter of the one embodiment of the present invention.

FIG. 1 displays a current mode DC/DC converter according to one embodiment of the present invention. Distinct points from FIG. 3 showing a conventional example of a power converter is that in order to avoid delay of response in the current mode control circuit 51, the DC/DC converter of the present invention is additionally provided with a feed forward circuit 41 comprising; a current detector 12 for detecting directly a variation in the load current Io flowing through the load resister RL, a current/voltage converter 22 for converting a detection current from the current detector 12 to a voltage, and an adder 31 for adding a voltage V2 of a variation detection signal fed from the current/voltage converter 22 to the voltage V1 of the coil current detection signal fed from the current/voltage converter 21 and for feeding the added value to the comparator A2. Further, the other portion of the circuitry is in common with aforementioned FIG. 3.

Figure 2:
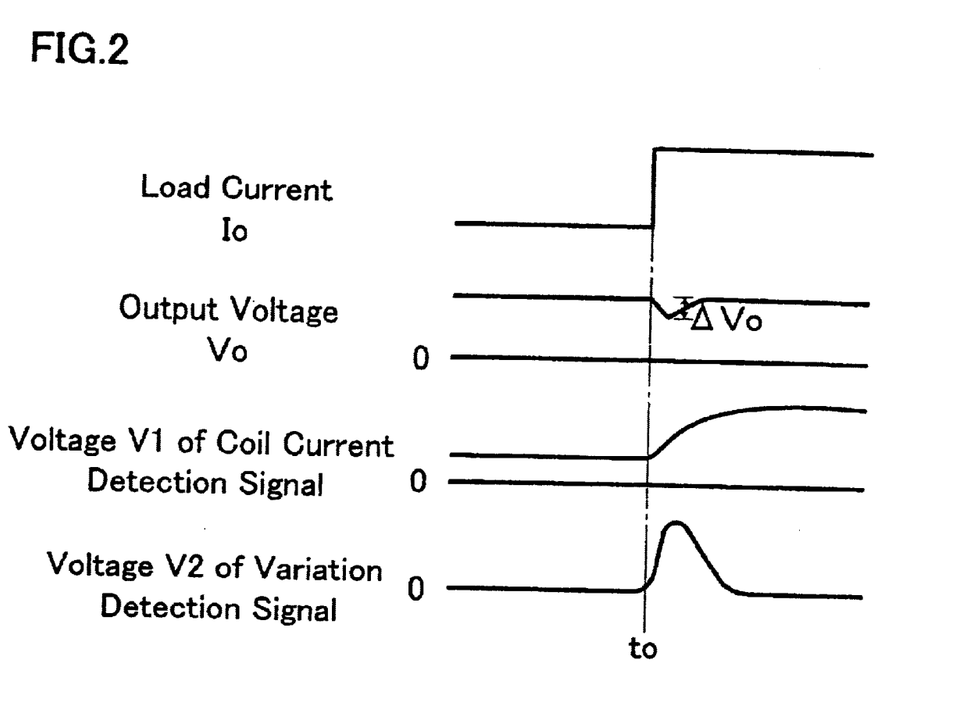
FIG. 2 is a waveform diagram of each section at the time of an abrupt change in load current in the aforementioned embodiment.

Next is a description of operation of the circuitry in abovementioned FIG. 1 with reference to waveforms in FIG. 2. Here, FIG. 2 displays waveforms of each section before and after an abrupt change in the load current Io. From the upper side in the figure, shown are respective waveforms of; the load current Io, an output voltage Vo, the voltage V1 of the coil current detection signal from the current/voltage converter 21, and the voltage V2 of the variation detection signal from the current/voltage converter 22.

Operation at steady state is the same as that of the conventional example described in FIG. 3. That is, at the time of nearly steady load current Io, nothing is output from the current detector 12 for detecting the variation in the load current Io so that such situation occurs that the feed forward circuit 41 becomes ineffective on the current mode control circuit 51. Accordingly, when the switching element Q1 turns on, the coil current I2 increases linearly with the lapse of time. Thus, when the coil current I2 exceeds the load current Io, a flowing direction of the charge and discharge current I1 of the capacitor C1 converts from that for discharge to that for charge. Then, in the current mode control circuit 51, the error amplifier A1 compares a voltage detection signal produced by dividing the output voltage Vo with a reference voltage Vref and the comparator A2 compares a voltage V3 of the error signal produced by amplifying the error yielded from the error amplifier A1 with the voltage V1 of the current detection signal proportional to the coil current I2. When the voltage V1 of the coil current detection signal exceeds the voltage V3 of the error signal, the current mode control circuit 51 turns off the switching element Q1 by the reset pulse from the comparator A2 via the RS flip-flop circuit 26.

When the switching element Q1 turns off, the coil current I2 decreases linearly with the lapse of time from then and when the coil current I2 falls below the load current Io, a flowing direction of charge and discharge current I1 of the capacitor C1 converts from that for charge to that for discharge. Further, one cycle later, the set pulse is generated from the oscillator 25 so that the current mode control circuit 51 turns on the switching element Q1 by the set pulse via the RS flip-flop circuit 26. Thus, the current mode control circuit 51 detects, as the coil current I2, the total of the load current Io and the charge and discharge current I1, of the capacitor C1, that is a ripple current. However, when the output current is nearly constant at steady state, a ripple variation in the charge and discharge current I1 of the capacitor C1 becomes also approximately constant.

On the other hand, as shown in FIG. 2, when the output current Io increases abruptly at the time to, the current detector 12 comprising the feed forward circuit 41 detects the variation in the load current Io to output a detection current corresponding to the variation to the current/voltage converter 22. Then, the current/voltage converter 22 converts the detection current from the current detector 12 to a voltage as a variation detection signal, whose voltage V2 is added to the voltage V1 of the current detection signal from the other current/voltage converter 21 by the adder 31. At this time, in the comparator A2 preceded by the comparator A1, a magnitude of a voltage (V1+V2), that is the sum of the voltage V1 of the coil current detection signal and the voltage V2 corresponding to the variation of the load current Io, and a magnitude of the voltage V3 of the error signal from the error amplifier A1 are compared each other, so that a switching pulse, by which the coil current I2 changes quickly in response to the abrupt change of the load current Io, is fed to the switching element Q1 from the RS flip-flop circuit 26. Accordingly, a certain measure of compensation for the abrupt variation by means of changing the coil current I2 can cause a change in the charge and discharge current I1 of the capacitor C1 to be eliminated so that a drop of the output voltage Vo, that is, a variation ΔVo can be made smaller than that in a conventional power converter. Specifically, the faster the response of the comparator A2 for compensation of the feed forward becomes, the smaller the variation ΔVo in the output voltage Vo at the time of the abrupt change in the load current Io.

Moreover, since, at the abrupt change in the load current Io, electric charges corresponding to the delay of the response in the conventional current mode control are discharged from the smoothing capacitor C1 to the load resister RL, there occurs a drawback that the ripple variation in the charge and discharge current I1 of the capacitor C1 increases. However, in the present embodiment, the coil current I2 compensates quickly the abrupt change in the load current Io so that a ripple variation in the charge and discharge current I1 of the capacitor C1 decreases and as a result, a capacity of the smoothing capacitor C1 can be reduced.

As mentioned above in the present embodiment, the current mode DC/DC converter provided with the current mode control circuit 51, serving as a feedback circuit for stabilizing the output voltage Vo supplied to a load, that is, the load resister RL, which detects the coil current I2 flowing through the choke coil L1 and controls switching operation of the switching element Q1 according to the result of comparison between the detection signal and the error signal from the error amplifier A1, serving as the reference signal, wherein the feed forward circuit 41 is provided which detects the variation in the load current Io flowing through the load resister RL to add the variation to the detection signal of the coil current I2.

Thus, since at steady state the load current Io is almost unchangeable, the feed forward circuit 41 detects no variation in the load current Io so that the current mode control circuit 51 controls switching operation of the switching element Q1, in the same way as does a conventional power converter, according to the result of comparison between the detection signal of the coil current I2 flowing through the choke coil L1 and the error signal from the error amplifier A1. Accordingly, there occurs no change in a characteristic of the current mode control at steady state.

On the other hand, when the load current Io changes abruptly for some cause or other, the feed forward circuit 41 detects the variation in the load current Io at the time to add the variation to the detection signal of the coil current I2. The current mode control circuit 51 compares the error signal from the error amplifier A1 with the sum of the detection signal of the coil current I2 and the variation in the load current Io to control switching operation of the switching element Q1 according to the result of the comparison. Thereby, a switching pulse, by which the coil current I2 changes quickly in response to the abrupt change in the load current Io, can be fed from the current mode control circuit 51 to the switching element Q1 so that the variation ΔVo of the output voltage Vo can be reduced.

The current mode DC/DC converter of the present invention is described above according to the aforementioned embodiment. However, the present invention is not limited to the above embodiment and numerous modifications are possible. In the present embodiment, the example of the peak current mode was described. However, the present invention can be applied to an average current mode and the other current mode also.

What is claimed is:

1. A current made DC/DC regulator having function for detecting input and output of current and voltage provided with a current mode control circuit, with a load connected across a smoothing capacitor coupled in series with a choke coil and generating an output voltage, which detects a current flowing through a choke coil, serving as a feedback circuit for stabilizing said output voltage supplied to the load, and controls switching operation of a switching element according to a result of comparison between a detection signal and an error signal, serving as a reference signal, of an output signal, wherein a feed forward circuit is provided which detects a variation in a load current flowing through said load at a subsequent stage to said smoothing capacitor and adds the variation to the detection signal of said coil current.

2. A current mode DC/DC regulator according to claim 1, wherein said feed forward circuit is ineffective to said current mode circuit when no variation in said load current is detected.

3. A current mode DC/DC regulator according to claim 1, wherein a capacitor is provided which is charged when said coil current exceeds a load current and supplies its charge to said load when said coil current falls below a load current.

4. A current mode DC/DC regulator according to claim 3, wherein said current mode control circuit feeds a switching pulse, by which said coil current changes quickly when said feed forward circuit detects a variation in the load current, to said switching element.

5. A current mode DC/DC regulator having function for detecting input end output of current and voltage provided with a current mode control circuit, serving as a feedback circuit for stabilizing an output voltage supplied to a load, which detects a coil current flowing through a choke coil and controls switching operation of a switching element according to a result of comparison between a detection signal of the coil current and an error signal of an output voltage, serving as a reference signal, wherein a feed forward circuit is provided which detects a variation in a load current flowing through said load and adds the variation to the detection signal of said coil current, wherein said feed forward circuit is provided with;

a first current detector for detecting directly a variation in the load current, a first current/voltage converter for converting a detection current from the first current detector to a voltage, and an adder for adding a voltage of a variation detection signal supplied from said first current/voltage converter to a voltage of a detection signal of said coil current and further said current mode control circuit is provided with;

an error amplifier for generating an error signal of said output voltage by comparing a voltage detection signal yielded by dividing the output voltage with a reference signal, a second current detector for detecting said coil current, a second current/voltage converter for converting a detection current from the second current detector to a voltage to feed a detection signal of said coil current to said adder, a comparator for feeding a reset pulse when a voltage added by said adder exceeds a voltage of said error signal, and flip-flop circuit for turning on said switching element by a set pulse output from an oscillator and turning off said switching element by reset pulse from said comparator.

* * * * *

UNITED STATES PATENT AND TRADEMARK OFFICE
CERTIFICATE OF CORRECTION

| | | |
|---|---|---|
| PATENT NO. | : 6,646,426 B2 | Page 1 of 1 |
| APPLICATION NO. | : 10/104416 | |
| DATED | : November 11, 2003 | |
| INVENTOR(S) | : Hiroto Terashi | |

It is certified that error appears in the above-identified patent and that said Letters Patent is hereby corrected as shown below:

Claim 5 (column 7, line 7), replace "end" with --and--

Signed and Sealed this

Fourteenth Day of November, 2006

JON W. DUDAS
*Director of the United States Patent and Trademark Office*